United States Patent
Foust et al.

(10) Patent No.: US 10,769,084 B2
(45) Date of Patent: Sep. 8, 2020

(54) OUT-OF BAND INTERRUPT MAPPING IN MIPI IMPROVED INTER-INTEGRATED CIRCUIT COMMUNICATION

(71) Applicant: Intel Corporation, Santa Clara, CA (US)

(72) Inventors: Kenneth P. Foust, Beaverton, OR (US); Duane G. Quiet, Hillsboro, OR (US); Amit Kumar Srivastava, Penang (MY)

(73) Assignee: Intel Corporation, Santa Clara, CA (US)

( * ) Notice: Subject to any disclaimer, the term of this patent is extended or adjusted under 35 U.S.C. 154(b) by 587 days.

(21) Appl. No.: 15/474,117

(22) Filed: Mar. 30, 2017

(65) Prior Publication Data

US 2018/0181507 A1   Jun. 28, 2018

Related U.S. Application Data

(60) Provisional application No. 62/437,971, filed on Dec. 22, 2016.

(51) Int. Cl.
*G06F 13/24*   (2006.01)
*G06F 13/42*   (2006.01)

(52) U.S. Cl.
CPC .......... *G06F 13/24* (2013.01); *G06F 13/4282* (2013.01)

(58) Field of Classification Search
CPC ............................. G06F 13/24; G06F 13/4282
See application file for complete search history.

(56) References Cited

U.S. PATENT DOCUMENTS

| | | | |
|---|---|---|---|
| 2009/0157929 A1* | 6/2009 | Pigott | G06F 13/4291 710/110 |
| 2014/0229644 A1* | 8/2014 | Thanigasalam | G06F 13/24 710/110 |
| 2014/0344595 A1* | 11/2014 | Jenne | G06F 1/32 713/320 |
| 2017/0075852 A1* | 3/2017 | Mishra | G06F 13/4282 |
| 2017/0104733 A1* | 4/2017 | Thanigasalam | G06F 13/1673 |
| 2019/0370217 A1* | 12/2019 | Wilson | G06F 13/4295 |

OTHER PUBLICATIONS

"Introduction to the MIPI I3C Standardized Sensor Interface," MIPI Alliance, Inc., MEMS and Sensors Whitepaper Series, Aug. 2016, 11 pages.
Foust, Ken, "A Developer's Guide to MIPI I3C Implementation," Sep. 2016, 23 pages.

\* cited by examiner

*Primary Examiner* — Henry Tsai
*Assistant Examiner* — Christopher Daley
(74) *Attorney, Agent, or Firm* — Schwabe, Williamson & Wyatt, P.C.

(57) ABSTRACT

Embodiments of the present disclosure may relate to a host controller that includes processing circuitry to identify an inter-integrated circuit ($I^2C$) out-of-band interrupt (OBI) received on a general purpose input-output (GPIO) pin from an $I^2C$ device that is unable to generate an improved inter-integrated circuit (I3C) bus an I3C in-band interrupt (IBI). The processing circuitry may further generate, based on the $I^2C$ OBI, an I3C IBI that includes information related to the $I^2C$ OBI. The host controller may further include transmission circuitry to transmit the I3C IBI on an I3C bus. Other embodiments may be described and/or claimed.

19 Claims, 6 Drawing Sheets

| Open Drain (Master Drive) | Open Drain (Master Drive) | Open Drain (Master Drive) | Push-Pull (Master Drive) | Drive High or Low, and then High-Z (Master Drive) | Push-Pull (Master Drive) |
|---|---|---|---|---|---|
| S | I2C Slave_addr as_IBI (high-order bits/Msb inverted) / R | Master_ACK | Slave_byte | T | Sr |

Figure 2

OUT-OF BAND INTERRUPT MAPPING IN MIPI IMPROVED INTER-INTEGRATED CIRCUIT COMMUNICATION

CROSS REFERENCE TO RELATED APPLICATIONS

This application claims priority under 35 U.S.C. § 119(e) to U.S. Provisional Patent Application No. 62/437,971 entitled "OUT OF BAND INTERRUPT MAPPING IN MIPI I3C," filed Dec. 22, 2016, the disclosure of which is incorporated herein by reference.

FIELD

Embodiments of the present disclosure generally relate to the field of chip-to-chip communication and, more particularly, to out-of-band interrupt ("OBI") mapping in Mobile Industry Processor Interface (MIPI) improved inter-integrated circuit ("I3C") communication.

BACKGROUND

MIPI I3C is a bus interface that connects peripheral devices to an application processor. As an integration technology, MIPI I3C also enables connections among various types of peripheral devices. The MIPI I3C bus interface standard provides improvements to the MIPI inter-integrated circuit ("I$^2$C") bus interface standard. The objectives of the MIPI I3C standard include standardizing peripheral device communication, supporting low-power, high-speed peripheral device communication, and reducing the number of wires used in peripheral device communication.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

FIG. 2 depicts an example I3C in-band interrupt ("IBI"), in accordance with various embodiments.

DETAILED DESCRIPTION

Figure 1:
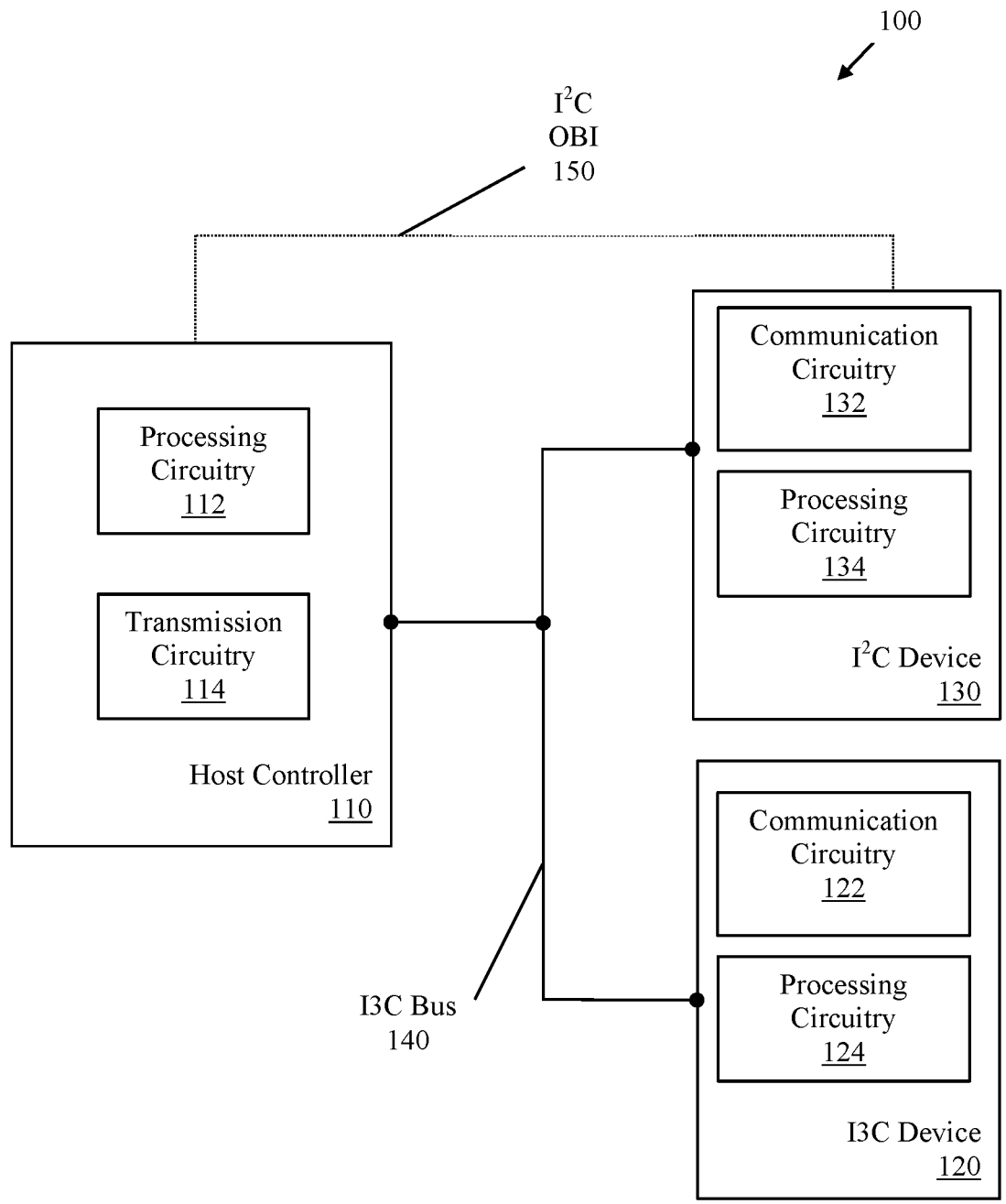
FIG. 1 depicts an example MIPI I3C system, in accordance with various embodiments.

Embodiments of the present disclosure may relate to a host controller that includes processing circuitry to identify an I$^2$C OBI received on a general purpose input-output (GPIO) pin from an I$^2$C device that is unable to generate an I3C IBI. The processing circuitry may further generate, based on the I$^2$C OBI, an I3C IBI that includes information related to the I$^2$C OBI. The host controller may further include transmission circuitry to transmit the I3C IBI on an I3C bus. In this way, an I3C system may reduce and/or eliminate device pin count and signal paths that may otherwise be included due to an I$^2$C device's inability to generate an I3C IBI.

In the following description, various aspects of the illustrative implementations will be described using terms commonly employed by those skilled in the art to convey the substance of their work to others skilled in the art. However, it will be apparent to those skilled in the art that embodiments of the present disclosure may be practiced with only some of the described aspects. For purposes of explanation, specific numbers, materials, and configurations are set forth in order to provide a thorough understanding of the illustrative implementations. It will be apparent to one skilled in the art that embodiments of the present disclosure may be practiced without the specific details. In other instances, well-known features are omitted or simplified in order not to obscure the illustrative implementations.

In the following detailed description, reference is made to the accompanying drawings that form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C).

The description may use perspective-based descriptions such as top/bottom, in/out, over/under, and the like. Such descriptions are merely used to facilitate the discussion and are not intended to restrict the application of embodiments described herein to any particular orientation.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. The term "directly coupled" may mean that two or more elements are in direct contact.

As used herein, the term "module" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable components that provide the described functionality.

The MIPI I3C standard provides a bus interface between a host processor and peripheral devices, such as, for example, sensors, power management integrated circuits, non-volatile memory, such as, for example, electronically erasable programmable read-only memory, modems, touchscreens, and embedded controllers. With sensors, for example, mobile devices or systems, for example, may employ sensors in, for example, smartphones, wearable technology devices, Internet of Things ("IoT") devices, or automobile systems. Sensors may be used to interpret, for example, motion, proximity, or temperature. Types of sensors may include, for example, accelerometers, gyroscopes, barometers, light sensors/photometers, or temperature sensors/thermometers.

The MIPI I3C standard defines various device roles, including an I3C host controller, which may also be known as an I3C main master or an I3C master. An I3C host controller may control the I3C bus interface, or "I3C bus." Another role may be an I3C secondary master, which may take temporary control of the I3C bus with permission from the I3C host controller and pass control back to the I3C host controller upon completion of control tasks. Another role may be a slave, which may respond to commands from the I3C host controller.

An interrupt may be a signal that may cause a host processor to stop work on one process and start work on another. I3C is a two-wire bus that may include a serial data line ("SDA"), which may carry bidirectional data, and a serial clock line ("SCL"), which may either act as a clock or carry data. The MIPI I3C standard may support slave-initiated IBIs on the two-wire I3C bus.

An IBI is an interrupt that may be sent on an I3C bus. An OBI is an interrupt that may be sent on a separate wire, for example, a GPIO pin, which may also be known as a GPIO. Thus, an IBI may enable devices present on an I3C bus to issue interrupts without using extra wires or input-output pins, which may reduce device pin count and signal paths.

The MIPI I3C standard may be backward compatible with the MIPI I$^2$C standard, which may enable a device or devices that operate based on the MIPI I$^2$C bus interface standard (an "I$^2$C device" or "I$^2$C devices") to exist on the same bus interface as a device or devices that operate based on the I3C bus interface standard (an "I3C device" or "I3C devices"). With regard to peripheral devices, a sensor, for example, that operates based on the I3C bus interface standard may be referred to as an "I3C sensor," and a sensor that operates based on the I$^2$C bus interface standard may be referred to as an "I$^2$C sensor." An I$^2$C device may require out-of-band signals to implement interrupt functionality on an I3C bus, which may increase pin count and signal paths.

Embodiments herein relate to a mechanism for a MIPI I3C host controller to map onto an I3C bus, for consumption by I3C devices, OBIs generated by I$^2$C devices. This may be important, given that the MIPI I3C bus interface may reduce pin counts by handling slave device interrupts in-band over the I3C bus interface's two wires, while maintaining compatibility with I$^2$C slave devices that may be only able to generate OBIs, for example, on dedicated GPIO pins.

Further, the MIPI I3C bus interface has been designed such that when a slave device generates an IBI, which may include the interrupt source address and data (e.g., status, sensor data, etc.), multiple devices on an I3C bus may consume the interrupt content. Consumption of interrupt content may not be possible with I$^2$C devices, given that they may be unable to generate IBIs. Accordingly, I3C slave devices may be unable to consume interrupts, including sources and data, from I$^2$C devices present on an I3C bus, as they may be able to do with other I3C devices on the I3C bus, because I$^2$C devices may be unable to generate IBIs. Embodiments herein may allow an I3C host controller to generate an IBI on behalf of an I$^2$C device, so that interrupt content may be consumed by more devices on an I3C bus.

FIG. 1 depicts an example MIPI I3C system, in accordance with various embodiments. MIPI I3C System 100 may include a host controller 110, which may also be, for example, an I3C main master or an I3C master. Host controller 110 may include processing circuitry 112 and transmission circuitry 114 coupled with processing circuitry 112. As used herein, the term "circuitry" may refer to, be part of, or include an Application Specific Integrated Circuit ("ASIC"), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

MIPI I3C System 100 may further include I3C device 120, which may be, for example, an I3C slave, an I3C secondary master, an I3C smart sensor, an I3C sensor, an I3C hub, or an I3C engine. Further, I3C device 120 may be, for example, an I3C sensor or any other I3C peripheral device. MIPI I3C System 100 may further include I$^2$C device 130, which may be, for example, an I$^2$C slave or an I$^2$C sensor, or any other I$^2$C peripheral device. I3C bus 140 may directly or indirectly connect or directly or indirectly couple I3C host controller 110, I3C device 120, and/or I$^2$C device 130. I3C bus 140 may be, for example, a multi-drop I3C bus. Further, I$^2$C device 130 may issue or transmit I$^2$C OBI 150.

I3C device 120 may interrupt I3C host controller 110 using, an I3C IBI (not shown). I$^2$C device 130 may interrupt I3C host controller 110 by, for example, transitioning a dedicated GPIO (for example, low/high, high/low, pulse, etc.) as illustrated by I$^2$C OBI 150. As a result, only I3C host controller 110 may know the source of I$^2$C OBI 150, along with its data contents (status register, event details, etc.), generated by I$^2$C device 130.

Embodiments herein may relate to a solution for MIPI I3C that may enable an I3C device or devices, for example, I3C device 120, on an I3C bus, for example, I3C bus 140, to interpret the source and data contents of an OBI, for example, I$^2$C OBI 150, with the assistance of an I3C host controller, for example, I3C host controller 110. The I3C host controller may, for example, broadcast an I$^2$C device's OBI over an I3C bus. This functionality may enable I3C bus implementations to maintain the idea that if a slave device on an I3C bus generates an interrupt, such as an IBI, which may include the interrupt source and optional content data, multiple devices may consume the interrupt content, even when the interrupt may be an OBI generated by I$^2$C devices. This may introduce additional bus efficiency by possibly not having I3C devices generate additional traffic on an I3C bus to solicit interrupt data from I$^2$C devices.

FIG. 2 depicts an example I3C IBI, in accordance with various embodiments. FIG. 2 illustrates I3C IBI Sequence with Mapped I$^2$C Out of Band Interrupt 200. The above-described functionality may be achieved by enlisting an I3C host controller, for example, host controller 110, to generate I3C IBI Sequence with Mapped I$^2$C Out of Band Interrupt 200. An I$^2$C device, for example, I$^2$C device 130, may generate an OBI, for example, I$^2$C OBI 150, but may be unable to generate an IBI. Thus, I²C OBI 150 interrupt content may be consumed by I3C host controller 110, but not by I3C device 120.

I3C IBI Sequence with Mapped I²C Out of Band Interrupt 200 may include address block 202. In address block 202, higher-order bits may be inverted in the slave address of I²C device 130, such as, for example, the inversion of most significant bits ("Msb") or higher-order bits in the slave address of I²C device 130. The inversion of Msb or higher-order bits may include, for example, changing the first bit, which may be the most significant bit or the higher-order bit, or, for example, changing the first two or more bits, which may be the Msb or the higher-order bits, in an address from its original value to the opposite value, for example, from a 0 to a 1, or from a 1 to a 0. If I3C host controller 110 receives I²C OBI 150, I3C host controller 110 may generate I3C IBI Sequence with Mapped I²C Out of Band Interrupt 200, which may include address block 202, for transmission on I3C bus 140. Address block 202 may indicate I²C device 130 as the source of I²C OBI 150, and interrupt content may be consumed by devices on I3C bus 140, for example, I3C device 130.

Further, the inversion of Msb or higher-order bits in address block 202 may avoid I3C bus conflict with other devices, if I3C host controller 110 receives I²C OBI 150 and any optional content data from I²C device 130. If, for example, I²C device 130 is on I3C bus 140, inverting bits in the slave address of I²C device 130, rather than including the slave address of I²C device 130 without inverting any bits, may avoid bus conflict. This may be because I3C host controller 110 may transmit to devices, including I²C device 130, an I3C IBI that identifies I²C device 130 as the source of I²C OBI 150, without causing I²C device 130 to believe I3C host controller 110 is issuing a control task to I²C device 130.

In some embodiments, processing circuitry 112 may identify I²C OBI 150 received from I²C device 130. In some embodiments, I²C device 130 may be an I²C device that is unable to generate an I3C IBI. Processing circuitry 112 may identify I²C OBI 150 received, for example, on a GPIO pin. I²C OBI 150 may be, for example, a GPIO transition, a pulse, or some other type of interrupt. In some embodiments, processing circuitry 112 may generate, based on I²C OBI 150, an I3C IBI. In some embodiments, the I3C IBI may include, for example, information related to I²C OBI 150. I3C IBI may be, for example, I3C IBI Sequence with Mapped I²C Out of Band Interrupt 200, that may include information related to I²C OBI 150.

In some embodiments, the information related to I²C OBI 150 may include source information related to I²C OBI 150. The source information related to I²C OBI 150 may include, for example, the address of I²C device 130 where the Msb or higher-order bits of the address of I²C device 130 are inverted, as described above. In some embodiments, the information related to I²C OBI 150 may include the cause of I²C OBI 150. The cause of I²C OBI 150 may be, for example, a temperature sensor transmitting I²C OBI 150 upon sensing that a set temperature may have been exceeded.

In some embodiments, transmission circuitry 114 may transmit the I3C IBI on I3C bus 140. In some embodiment, transmission circuitry 114 may transmit or issue the I3C IBI to a device on I3C bus 140. In some embodiments, the device on I3C bus 140 may be, for example, I3C device 120 or I²C device 130. An I²C device on I3C bus 140 may include an I²C device that did not generate the OBI received by processing circuitry 112. Although FIG. 1 illustrates one I3C device and one I²C device on I3C bus 140, embodiments herein may include multiple I3C devices and/or multiple I²C devices. In some embodiments, an I3C device and/or an I²C device may be, for example, as described above, a sensor. However, the I3C device may be any type of I3C device, and the I²C device may be any type of I²C device.

In some embodiments, as described in more detail below, I3C device 120 may include, for example, communication circuitry 122 and processing circuitry 124 coupled with communication circuitry 122, and I²C device 130 may include, for example, communication circuitry 132 and processing circuitry 134 coupled with communication circuitry 132. In some embodiments, I3C System 100 may include a device on an I3C bus, for example, I3C device 120 or I²C device 130. In some embodiments, the device on the I3C bus may include communication circuitry, for example, communication circuitry 122 or communication 132, to identify a received I3C IBI, for example, I3C IBI Sequence with Mapped I²C Out of Band Interrupt 200, that includes information related to an I²C OBI.

In some embodiments, the device on the I3C bus may include processing circuitry, for example processing circuitry 124 or processing circuitry 134, to consume the information related to the I²C OBI. In some embodiments, the information related to the I²C OBI may include source information related to the I²C OBI. The source information related to the I²C OBI may include, for example, a source address that includes an address of an I²C slave device, where one or more higher-order bits of the address of the I²C slave device are inverted. In some embodiments, the information related to the I²C OBI may include a cause of the I²C OBI.

Figure 3:
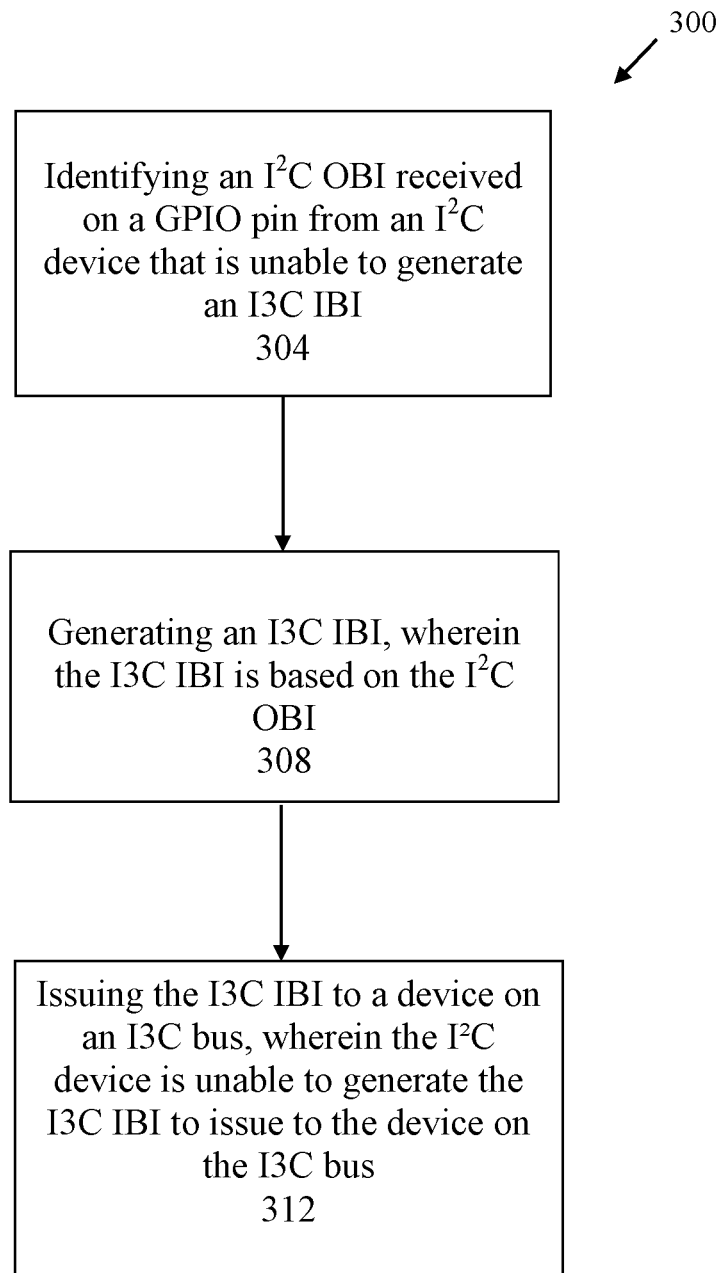
FIG. 3 depicts an example operation flow/algorithmic structure of a host controller, in accordance with various embodiments.

FIG. 3 depicts an example operation flow/algorithmic structure of a host controller, in accordance with various embodiments. Operation flow/algorithmic structure 300 may include, at 304, identifying a received I²C OBI from an I²C device. In some embodiments, identifying the I²C OBI includes identifying an I²C OBI received on a GPIO pin.

Operation flow/algorithmic structure 300 may further include, at 308, generating an I3C IBI, where the I3C IBI is based on the I²C OBI. In some embodiments, generating the I3C IBI includes mapping the I²C OBI onto the I3C bus.

Operation flow/algorithmic structure 300 may further include, at 312, issuing the I3C IBI to a device on an I3C bus, where the I²C device is unable to generate the I3C IBI to issue to the device on the I3C bus. In some embodiments, issuing the I3C IBI to the device on the I3C bus may include broadcasting the I3C IBI to the device on the I3C bus. In some embodiments, the device on the I3C bus may be an I3C device. In some embodiments, the device on the I3C bus may be the I²C device that generated the I²C OBI, or the I²C device may be a different I²C device. In some embodiments, the device on the I3C bus may be, for example, a sensor.

In some embodiments, the I3C IBI may include a source address that may indicate a source of the I²C OBI. In some embodiments, the source address may include a slave address of the I²C device. In some embodiments, for example higher-order bits of the slave address may be inverted. In some embodiments, the I3C IBI may include data regarding a cause of the I²C OBI.

In some embodiments, issuing the I3C IBI may include interrogating the I²C device and retrieving data regarding the cause of the I²C OBI. In some embodiments, interrogating the I²C device may include interrogating the I²C device through the I3C bus. In some embodiments, interrogating the I²C device through the I3C bus may include reading an event status register.

Figure 4:
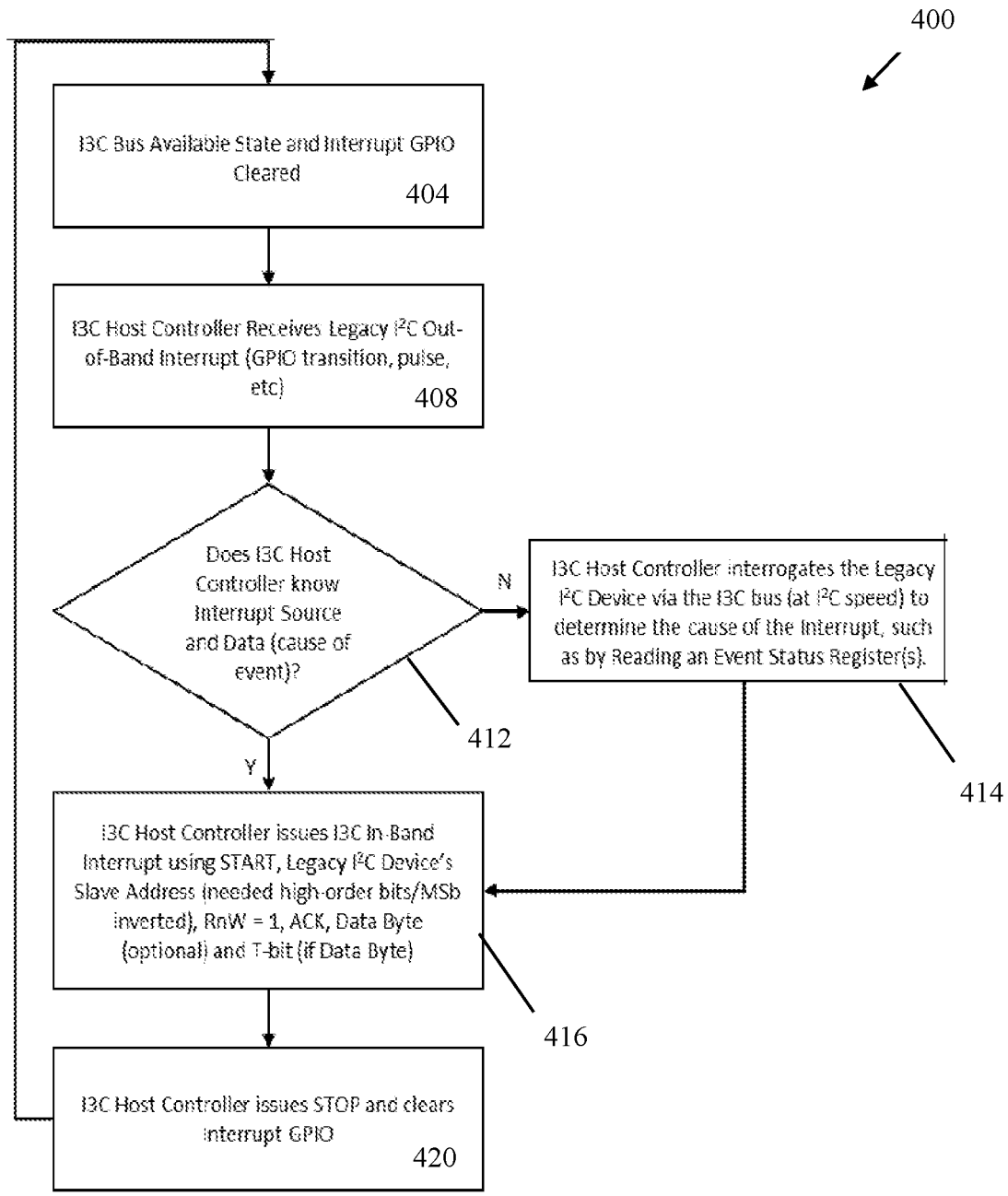
FIG. 4 depicts a more detailed example operation flow/algorithmic structure of a host controller, in accordance with various embodiments.

FIG. 4 depicts a more detailed example operation flow/algorithmic structure of a host controller, in accordance with various embodiments. FIG. 4 illustrates an operation flow/algorithmic structure that may enable I3C host controller 110 to map I²C OBI 150 onto an IBI mechanism of I3C bus 140. As described above, I3C IBI Sequence with Mapped I²C Out of Band Interrupt 200 includes address block 202 that includes a slave address with its Msb or higher-order bits inverted.

Operation flow/algorithmic structure 400 may include, at 404, a bus available state and interrupt GPIO cleared. Operation flow/algorithmic structure 400 may further include, at 408, the I3C host controller receives a Legacy I²C OBI by, for example, a GPIO transition, a pulse, etc.

Operation flow/algorithmic structure 400 may further include, at 412, the host controller determines whether it knows the interrupt source and data (cause of the event). If the I3C host controller does not know the cause of the interrupt, operation flow/algorithmic structure 400 may further include, at 414, the I3C host controller interrogates the Legacy I²C device via the I3C bus (at I²C speed), to determine the cause of the interrupt, such as by reading an event status register(s). If the I3C host controller knows the interrupt source and data (cause of the event), or after the I3C host controller has interrogated the Legacy I²C device, operation flow/algorithmic structure 400 may further include, at 416, the I3C host controller issues an I3C IBI using START, Legacy I²C device's slave address (needed high-order bits/Msb inverted), RnW=1, ACK, Data Byte (optional) and T-bit (if Data Byte). Operation flow/algorithmic structure 400 may further include, at 420, I3C host controller issues STOP and clears Interrupt GPIO, and operation flow/algorithmic structure 400 may further include returning to 404.

Figure 5:
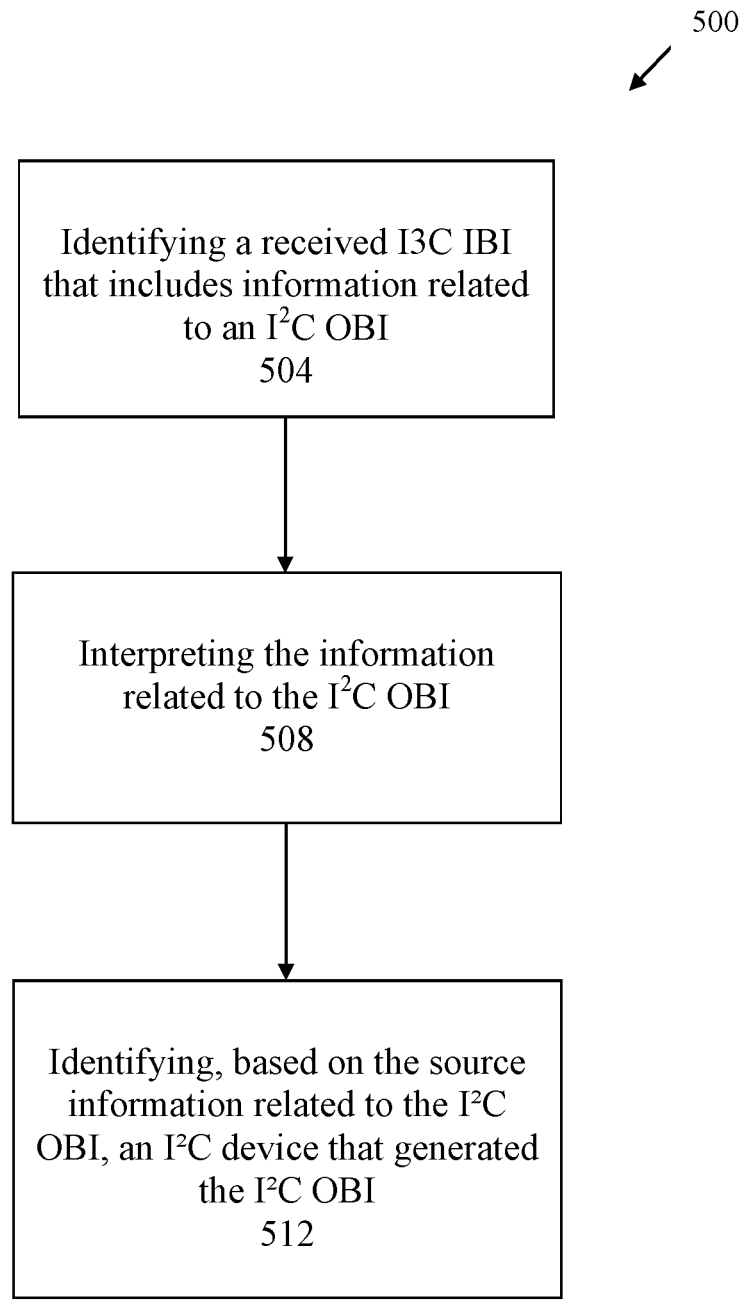
FIG. 5 depicts an example operation flow/algorithmic structure of a slave device, in accordance with various embodiments.

FIG. 5 depicts an example operation flow/algorithmic structure of a slave device, in accordance with various embodiments. Operation flow/algorithmic structure 500 may include, at 504, identifying a received I3C IBI that includes information related to an I²C OBI.

Operation flow/algorithmic structure 500 may further include, at 508, interpreting the information related to the I²C OBI, where the information related to the I²C OBI includes source information related to the I²C OBI. In some embodiments, the source information related to the I²C OBI may include, for example, an address of an I²C device that generated the I²C OBI, where one or more higher-order bits of the address of the I²C device are inverted. In some embodiments, the information related to the I²C OBI may include a cause of the I²C OBI. Operation flow/algorithmic structure 500 may further include, at 512, identifying, based on the source information related to the I²C OBI, an I²C device that generated the I²C OBI.

Figure 6:
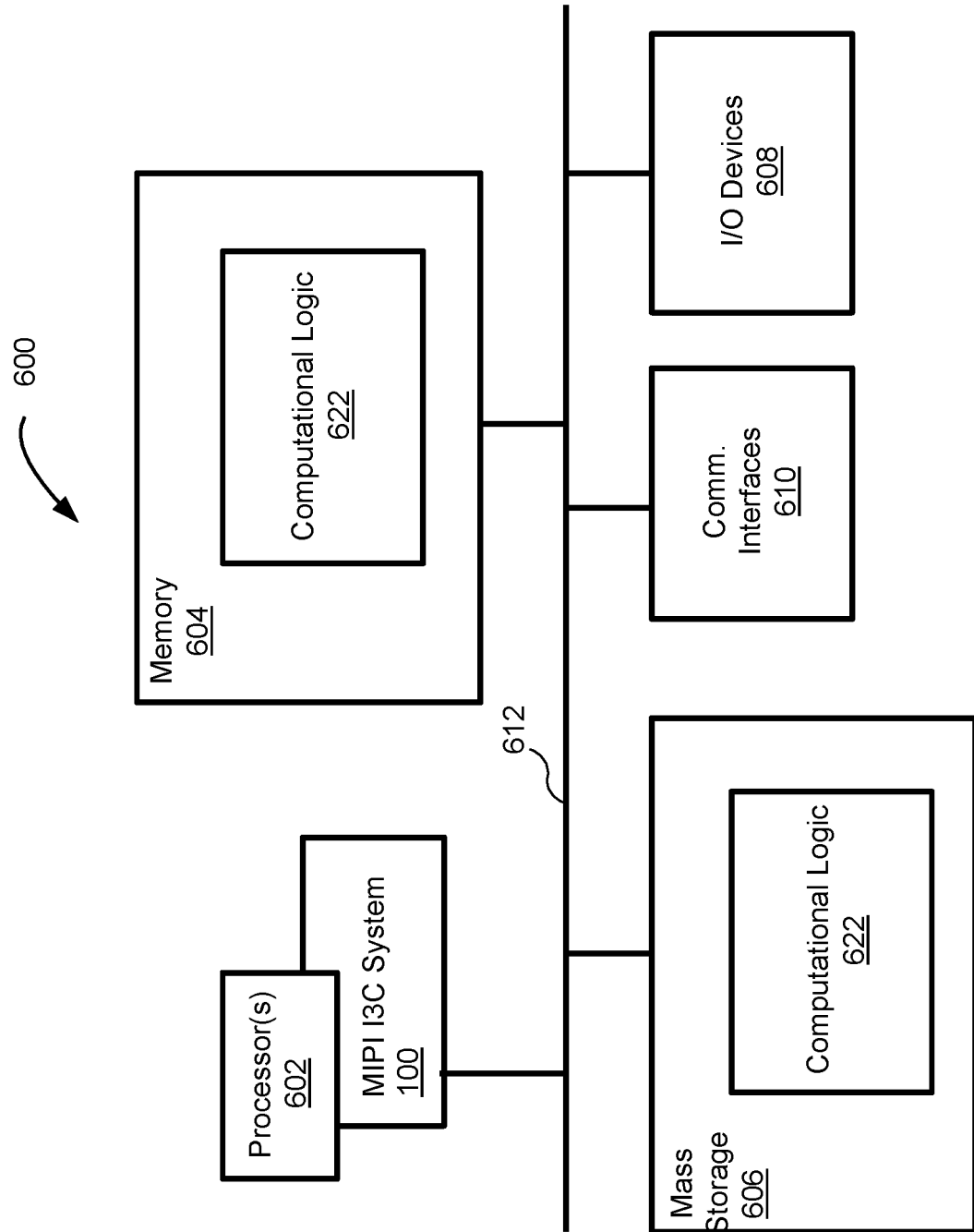
FIG. 6 depicts an example computing device, in accordance with various embodiments.

FIG. 6 illustrates an example computing device 600 suitable for use with various components of FIG. 1. For example, the computing device 600 may include host controller 110 and/or I3C device 120 and/or I²C device 130. As shown, computing device 600 may include one or more processors or processor cores 602 and system memory 604. For the purpose of this application, including the claims, the terms "processor" and "processor cores" may be considered synonymous, unless the context clearly requires otherwise. The processor 602 may include any type of processors, such as a central processing unit (CPU), a microprocessor, and the like, including, for example, MIPI I3C system 100 that includes host controller 110, I3C device 120, I²C device 130.

The processor 602 may be implemented as an integrated circuit having multi-cores, e.g., a multi-core microprocessor.

The computing device 600 may include mass storage devices 606 (such as diskette, hard drive, volatile memory (e.g., dynamic random-access memory (DRAM), compact disc read-only memory (CD-ROM), digital versatile disk (DVD), and so forth). In general, system memory 604 and/or mass storage devices 606 may be temporal and/or persistent storage of any type, including, but not limited to, volatile and non-volatile memory, optical, magnetic, and/or solid state mass storage, and so forth. Volatile memory may include, but is not limited to, static and/or dynamic random access memory. Non-volatile memory may include, but is not limited to, electrically erasable programmable read-only memory, phase change memory, resistive memory, and so forth.

The computing device 600 may further include I/O devices 608 (such as a display (e.g., a touchscreen display)), keyboard, cursor control, remote control, gaming controller, image capture device, a camera, one or more sensors, and so forth) and communication interfaces 610 (such as network interface cards, modems, infrared receivers, radio receivers (e.g., Bluetooth), and so forth).

The communication interfaces 610 may include communication chips (not shown) that may be configured to operate the device 600 in accordance with a Global System for Mobile Communication (GSM), General Packet Radio Service (GPRS), Universal Mobile Telecommunications System (UMTS), High Speed Packet Access (HSPA), Evolved HSPA (E-HSPA), or Long-Term Evolution (LTE) network. The communication chips may also be configured to operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chips may be configured to operate in accordance with Code Division Multiple Access (CDMA), Time Division Multiple Access (TDMA), Digital Enhanced Cordless Telecommunications (DECT), Evolution-Data Optimized (EV-DO), derivatives thereof, as well as any other wireless protocols that are designated as 3G, 4G, 5G, and beyond.

The above-described computing device 600 elements may be coupled to each other via system bus 612, which may represent one or more buses, and which may include, for example, I3C bus 140. In the case of multiple buses, they may be bridged by one or more bus bridges (not shown). Each of these elements may perform its conventional functions known in the art. In particular, system memory 604 and mass storage devices 606 may be employed to store a working copy and a permanent copy of the programming instructions for the operation of various components of computing device 600, including but not limited to an operating system of computing device 600 and/or one or more applications. The various elements may be implemented by assembler instructions supported by processor(s) 602 or high-level languages that may be compiled into such instructions.

The permanent copy of the programming instructions may be placed into mass storage devices 606 in the factory, or in the field through, for example, a distribution medium (not shown), such as a compact disc (CD), or through communication interface 610 (from a distribution server (not shown)). That is, one or more distribution media having an implementation of the agent program may be employed to distribute the agent and to program various computing devices.

The number, capability, and/or capacity of the elements 608, 610, 612 may vary, depending on whether computing device 600 is used as a stationary computing device, such as a set-top box or desktop computer, or a mobile computing device, such as a tablet computing device, laptop computer, game console, or smartphone. Their constitutions are otherwise known, and accordingly will not be further described.

In embodiments, memory 604 may include computational logic 622 configured to implement various firmware and/or software services associated with operations of the computing device 600. For some embodiments, at least one of processors 602 may be packaged together with computational logic 622 configured to practice aspects of embodiments described herein to form a System in Package (SiP) or a System on Chip (SoC).

In various implementations, the computing device 600 may be one or more components of a data center, a laptop, a netbook, a notebook, an ultrabook, a smartphone, a tablet, a personal digital assistant (PDA), an ultra mobile PC, a mobile phone, a digital camera, or an IoT user equipment. In further implementations, the computing device 600 may be any other electronic device that processes data.

Various embodiments may include any suitable combination of the above-described embodiments including alternative (or) embodiments of embodiments that are described in conjunctive form (and) above (e.g., the "and" may be "and/or"). Furthermore, some embodiments may include one or more articles of manufacture (e.g., non-transitory computer-readable media) having instructions, stored thereon, that when executed result in actions of any of the above-described embodiments. Moreover, some embodiments may include apparatuses or systems having any suitable means for carrying out the various operations of the above-described embodiments.

The above description of illustrated implementations, including what is described in the Abstract, is not intended to be exhaustive or to limit the embodiments of the present disclosure to the precise forms disclosed. While specific implementations and examples are described herein for illustrative purposes, various equivalent modifications are possible within the scope of the present disclosure, as those skilled in the relevant art will recognize.

These modifications may be made to embodiments of the present disclosure in light of the above detailed description. The terms used in the following claims should not be construed to limit various embodiments of the present disclosure to the specific implementations disclosed in the specification and the claims. Rather, the scope is to be determined entirely by the following claims, which are to be construed in accordance with established doctrines of claim interpretation.

Some non-limiting examples are provided below.

EXAMPLES

Example 1 may include a host controller comprising: processing circuitry to identify an inter-integrated circuit ($I^2C$) out-of-band interrupt (OBI) received on a general purpose input-output (GPIO) pin from an $I^2C$ device that is unable to generate an improved inter-integrated circuit (I3C) in-band interrupt (IBI) and generate, based on the $I^2C$ OBI, an I3C IBI that includes information related to the $I^2C$ OBI; and transmission circuitry coupled with the processing circuitry, the transmission circuitry to transmit the I3C IBI on an I3C bus.

Example 2 may include the host controller of example 1, wherein the information related to the $I^2C$ OBI includes source information related to the $I^2C$ OBI.

Example 3 may include the host controller of example 2, wherein the source information related to the $I^2C$ OBI includes an address related to the $I^2C$ device, wherein most significant bits of the address related to the $I^2C$ device are inverted.

Example 4 may include the host controller of examples 1-3, wherein the information related to the $I^2C$ OBI includes a cause of the $I^2C$ OBI.

Example 5 may include the host controller of examples 1-4, wherein the transmission circuitry is to transmit the I3C IBI to a device on the I3C bus.

Example 6 may include the host controller of example 5, wherein the device on the I3C bus is an I3C device or an $I^2C$ device.

Example 7 may include the host controller of example 6, wherein the I3C device is an I3C peripheral device.

Example 8 may include the host controller of example 7, wherein the I3C peripheral device is a sensor.

Example 9 may include the host controller of example 6, wherein the $I^2C$ device is the $I^2C$ device that is unable to generate the I3C IBI.

Example 10 may include a device on an improved inter-integrated circuit (I3C) bus, the device comprising: communication circuitry to identify a received I3C in-band interrupt (IBI) that includes information related to an inter-integrated circuit ($I^2C$) out-of-band interrupt (OBI); and processing circuitry coupled with the communication circuitry, the processing circuitry to consume the information related to the $I^2C$ OBI, and identify a source of the $I^2C$ OBI, based on the information related to the $I^2C$ OBI.

Example 11 may include the device of example 10, wherein the information related to the $I^2C$ OBI includes source information related to the $I^2C$ OBI.

Example 12 may include the device of example 11, wherein the source information related to the $I^2C$ OBI includes a source address that includes an address of an $I^2C$ slave device, wherein one or more higher-order bits of the address of the $I^2C$ slave device are inverted.

Example 13 may include the device of examples 10-12, wherein the information related to the $I^2C$ OBI includes a cause of the $I^2C$ OBI.

Example 14 may include one or more non-transitory computer readable media comprising computer readable instructions which, when executed by a host controller, cause the host controller to: identify a received inter-integrated circuit ($I^2C$) out-of-band interrupt (OBI) from an $I^2C$ device; generate an improved inter-integrated circuit (I3C) in-band interrupt (IBI), wherein the I3C IBI is based on the $I^2C$ OBI; and issue the I3C IBI to a device on an I3C bus, wherein the $I^2C$ device is unable to generate the I3C IBI to issue to the device on the I3C bus.

Example 15 may include the one or more non-transitory computer readable media of example 14, wherein to generate the I3C IBI includes to map the $I^2C$ OBI onto the I3C bus.

Example 16 may include the one or more non-transitory computer readable media of example 14, wherein to issue the I3C IBI to the device on the I3C bus includes to broadcast the I3C IBI to the device on the I3C bus.

Example 17 may include the one or more non-transitory computer readable media of examples 14-16, wherein the I3C IBI includes a source address that indicates a source of the $I^2C$ OBI.

Example 18 may include the one or more non-transitory computer readable media of example 17, wherein the source address includes a slave address of the I²C device, and wherein higher-order bits of the slave address are inverted.

Example 19 may include the one or more non-transitory computer readable media of examples 14-18, wherein the I3C IBI includes data regarding a cause of the I²C OBI.

Example 20 may include the one or more non-transitory computer readable media of example 19, wherein to issue the I3C IBI includes to interrogate the I²C device and retrieve the data regarding the cause of the I²C OBI.

Example 21 may include the one or more non-transitory computer readable media of example 20, wherein to interrogate the I²C device includes to interrogate the I²C device through an I3C bus.

Example 22 may include the one or more non-transitory computer readable media of example 21, wherein to interrogate the I²C device through the I3C bus includes to read an event status register.

Example 23 may include one or more non-transitory computer readable media comprising computer readable instructions which, when executed by a slave device on an improved inter-integrated circuit (I3C) bus, cause the slave device on the I3C bus to: identify a received I3C in-band interrupt (IBI) that includes information related to an inter-integrated circuit (I²C) out-of-band interrupt (OBI); interpret the information related to the I²C OBI, wherein the information related to the I²C OBI includes source information related to the I²C OBI; and identify, based on the source information related to the I²C OBI, an I²C device that generated the I²C OBI.

Example 24 may include the one or more non-transitory computer readable media of example 23, wherein the source information related to the I²C OBI includes an address of the I²C device that generated the I²C OBI, and wherein one or more higher-order bits of the address of the I²C device are inverted.

Example 25 may include the one or more non-transitory computer readable media of examples 23-24, wherein the information related to the I²C OBI includes a cause of the I²C OBI.

We claim:

1. A host controller comprising:
    processing circuitry to:
        identify an inter-integrated circuit (I²C) out-of-band interrupt (OBI) received on a general purpose input-output (GPIO) pin from an I²C device that is unable to directly generate an improved inter-integrated circuit (I3C) in-band interrupt (IBI) for consumption by one or more I3C devices coupled to an I3C bus, to which the I²C device and the host controller are also coupled; and
        generate on the I3C bus, on behalf of the I²C device, based on the I²C OBI, an I3C IBI that includes information related to the I²C OBI, including information indicating to the one or more I3C devices that the I²C OBI is from the I²C device; and
    transmission circuitry coupled with the processing circuitry, the transmission circuitry to transmit the I3C IBI on the I3C bus, on behalf of the I²C device, for the consumption by the one or more I3C devices.

2. The host controller of claim 1, wherein the information indicating to the I3C devices that the I²C OBI is from the I²C device includes an address related to the I²C device, wherein one or more most significant bits of the address related to the I²C device are inverted.

3. The host controller of claim 1, wherein the information related to the I²C OBI further includes a cause of the I²C OBI.

4. The host controller of claim 1, wherein at least one of the one or more I3C devices to consume the I3C IBI is an I3C peripheral device.

5. The host controller of claim 4, wherein the I3C peripheral device is a sensor.

6. An I3C device for an improved inter-integrated circuit (I3C) bus, the device comprising:
    communication circuitry to identify a received I3C in-band interrupt (IBI) that includes information related to an inter-integrated circuit (I²C) out-of-band interrupt (OBI) from an I²C device, the I3C IBI being received from another device over the I3C bus to which the I3C device the I²C device and the other device are coupled, the other device having transmitted the I3C IBI on behalf of the I²C device which is unable to directly generate the I3C IBI on the I3C bus, and the information related to the I²C OBI includes information indicating to the I3C device that the I²C OBI is from the I²C device; and
    processing circuitry coupled with the communication circuitry, the processing circuitry to:
        consume the information related to the I²C OBI.

7. The device of claim 6, wherein the information indicating to the I3C device that the I²C OBI is from the I²C device includes an address of the I²C device, wherein one or more higher-order bits of the address of the I²C device are inverted.

8. The device of claim 6, wherein the information related to the I²C OBI further includes a cause of the I²C OBI.

9. One or more non-transitory computer readable media comprising computer readable instructions which, when executed by a host controller, cause the host controller to:
    identify a received inter-integrated circuit (I²C) out-of-band interrupt (OBI) from an I²C device that is unable to directly generate an improved inter-integrated circuit (I3C) in-band interrupt (IBI) on an I3C bus for consumption by one or more I3C devices coupled to the I3C bus, to which the I²C device and the host controller are also coupled;
    generate the improved inter-integrated circuit (I3C) in-band interrupt (IBI), based on the I²C OBI, and includes information indicating to the one or more I3C devices that the I²C OBI is from the I²C device; and
    issue the I3C IBI on the I3C bus for consumption by the one or more I3C devices.

10. The one or more non-transitory computer readable media of claim 9, wherein to generate the I3C IBI includes to map the I²C OBI onto the I3C bus.

11. The one or more non-transitory computer readable media of claim 9, wherein to issue the I3C IBI on the I3C bus for the one or more I3C devices to consume, includes to broadcast the I3C IBI on the I3C bus.

12. The one or more non-transitory computer readable media of claim 11, wherein the information indicating to the one or more I3C devices that the I²C OBI is from the I²C device includes a slave address of the I²C device, and wherein higher-order bits of the slave address are inverted.

13. The one or more non-transitory computer readable media of claim 9, wherein the I3C IBI includes data regarding a cause of the I²C OBI.

14. The one or more non-transitory computer readable media of claim 13, wherein to issue the I3C IBI includes to:
    interrogate the I²C device for the cause of the I²C OBI; and retrieve the data regarding the cause of the I²C OBI from the I²C device.

15. The one or more non-transitory computer readable media of claim 14, wherein to interrogate the I²C device includes to interrogate the I²C device through the I3C bus.

16. The one or more non-transitory computer readable media of claim 15, wherein to interrogate the I²C device through the I3C bus includes to read an event status register of the I²C device.

17. One or more non-transitory computer readable media comprising computer readable instructions which, when executed by a slave device on an improved inter-integrated circuit (I3C) bus, cause the slave device on the I3C bus to:
identify an I3C in-band interrupt (IBI) received through the I3C bus, the I3C IBI including information related to an inter-integrated circuit (I²C) out-of-band interrupt (OBI) on which the I3C IBI is based, the I²C OBI being originated from an I²C device and provided to a master device, which in turn issued the I3C IBI on behalf of the I²C device, wherein the master device, the slave device and the I²C device are all coupled to the I3C bus, and the I²C device is unable to directly generate the I3C IBI on the I3C bus;
interpret the information related to the I²C OBI included in the I3C IBI, wherein the information related to the I²C OBI includes source information related to the I²C OBI identifying the I²C OBI is from the I²C device; and
identify, based on the source information related to the I²C OBI, the I²C device that generated the I²C OBI.

18. The one or more non-transitory computer readable media of claim 17, wherein the source information related to the I²C OBI includes an address of the I²C device that generated the I²C OBI, and wherein one or more higher-order bits of the address of the I²C device are inverted.

19. The one or more non-transitory computer readable media of claim 17, wherein the information related to the I²C OBI includes a cause of the I²C OBI.

* * * * *